INVENTORS.
JENNINGS W. ELLIOTT &
DONALD R. GRINE
BY
Brumbaugh, Free, Graves + Donohue
their ATTORNEYS INVENTORS.
JENNINGS W. ELLIOTT &
DONALD R. GRINE
their ATTORNEYS

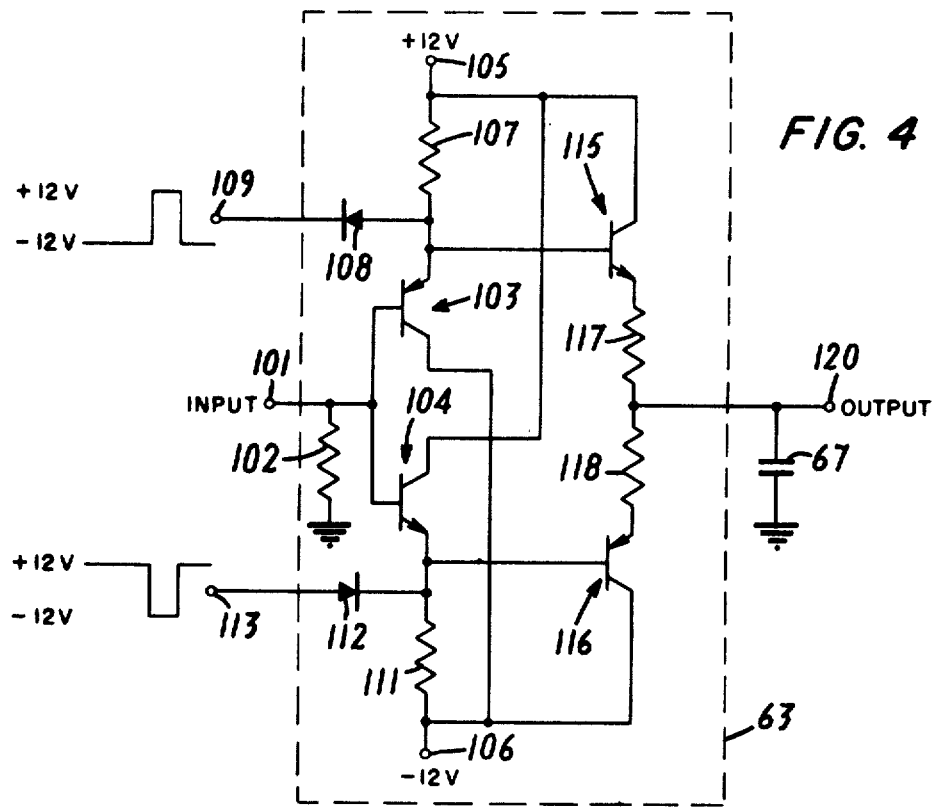
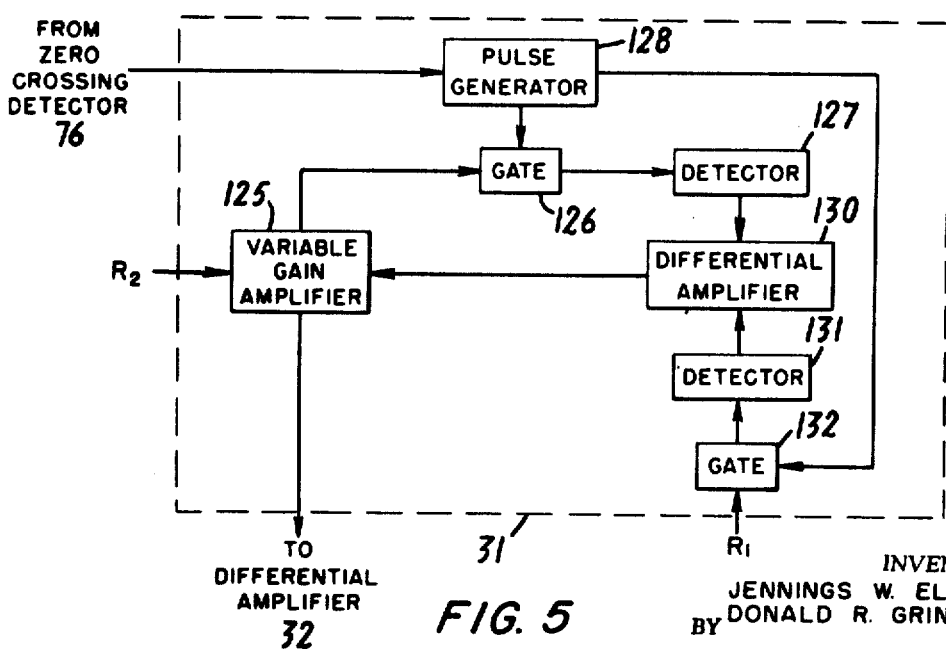

United States Patent Office 3,390,377
Patented June 25, 1968

3,390,377
ACOUSTICAL WELL LOGGING METHODS AND APPARATUS
Jennings W. Elliott, West Redding, and Donald R. Grine, Redding, Conn., assignors to Schlumberger Well Surveying Corporation, Houston, Tex., a corporation of Texas
Continuation-in-part of application Ser. No. 484,925, Sept. 3, 1965. This application June 6, 1967, Ser. No. 644,029
12 Claims. (Cl. 340—18)

ABSTRACT OF THE DISCLOSURE

An acoustical well logging system for detecting the shear wave arrivals of an acoustic wave propagated through earth formations surrounding a borehole by transmitting acoustic energy from the borehole into the formation, receiving the acoustic energy from the formation at two locations in the borehole spaced different distances from the transmitter, delaying the electrical signal generated by the receiver located closer to the transmitter in accordance with the transit time of acoustic energy traveling at formation compressional velocities between the two receivers, adjusting the amplitude of the electrical signal generated by the receiver remote from the transmitter in accordance with the attenuation of acoustic energy traveling at formation compressional velocities between the two receivers, and combining the delayed electrical signal and the adjusted amplitude electrical signal so as to cancel the components of the electrical signals corresponding to the waves traveling at formation compressional velocities between the transmitter and the receivers.

---

This is a continuation of application Ser. No. 484,925, which was filed Sept. 3, 1965, and now abandoned.

This invention relates to methods and apparatus for investigating earth formations traversed by a borehole and, more particularly, to improved methods and apparatus for making acoustical logs of such formations from which greater information may be obtained than is possible with known prior art systems.

Apparatus for making such acoustical well logs comprises a logging tool or sonde which is adapted to be passed through the well bore, surface equipment for interpreting and recording electrical signals received from the logging tool, and an interconnecting cable which serves both to conduct electrical signals and power between the tool and the surface equipment and also to support the tool during its passage through the bore.

A conventional logging tool may contain, for example, two or more electroacoustical transducers, one of which is suitable driven to transmit pulses of acoustic energy through the borehole fluid and into the surrounding formation. Some of the acoustic energy transmitted to the formation is refracted back through the drilling mud to the other transducers, which generate electrical signals in response thereto. As is well known, the acoustic energy will travel through the formations as compressional and shear waves and these waves will arrive first at the receiving transducer or transducers as long as their velocities in the formation are greater than the acoustic velocity in the borehole fluid, which is generally either a water base or an oil based drilling mud. In the past, it has been usual to examine the compressional wave arrivals, rather than the slower traveling shear wave components to obtain information about formation characteristics. Thus, the velocity or travel time as well as the amplitude or attenuation of the compressional waves are measured in order to obtain an indication of the character of the surrounding formation.

While a substantial amount of information can be obtained about a formation from compressional waves travelling therethrough, some important formation characteristics cannot be detected with them. For example, there is little or no attenuation of a compressional wave by a horizontal fracture, i.e. a fracture disposed perpendicular to the axis of the borehole, inasmuch as the particle motion of a compressional wave is in the direction of wave travel and compressional waves are readily transmitted by the fluids normally found in fractures. The transit time or velocity of a compressional wave (or a shear wave for that matter) is of little use in detecting fractures in most cases because of the relatively low percentage of fracture void to bulk volume. The location of even very thin fractures is important because oil or gas may be produced through such fractures, and if necessary these fractures may be opened by conventional means to increase the formation permeability and the production of hydrocarbons therein.

A shear wave, on the other hand, is highly attenuated by a fluid filled horizontal fracture, even if the thickness of the fracture is small compared to a wavelength so that a reflected wave therefrom is essentially cancelled by interference. This is because the particle motion of a shear wave is transverse to the direction of travel and a sheer wave is essentially not supported by a fluid. The shear wave particle motion being substantially parallel to the fracture, negligible energy from a shear wave is converted to be compressional wave at the formation-fluid interface.

Thus, an attenuation log of a shear wave is extremely valuable for locating horizontal fractures and for determining formation permeability. In addition, there is some evidence that a velocity or transit time log of a shear wave provides a better measure of porosity than that for a compressional wave. Also, it is useful to have logs of the attenuation and velocity of both the shear and compressional waves for determining the lithology of the formation.

Unfortunately, shear waves are difficult to detect inasmuch as they are generally obscured by prior compressional arrivals. As is well known, the velocity of a shear wave through a formation is considerably less than that of a compressional wave. Thus, it has been proposed to separate the electric signals produced in a receiver by the compressional and shear waves by making the length of the path travelled by the waves between the transmitter and the receiver a predetermined value which shifts the phase between these waves by 90 degrees. A phase and amplitude detector is then used to separate the two types of signals. However, different ground materials substantially alter the speeds of propagation of both types of waves, so that it has not been possible to achieve satisfactory results with this technique.

In accordance with another prior art method, the signals produced by the receiver are displayed on the screen of a cathode ray tube. An observer estimates the relative attenuation of a first signal corresponding to the compressional wave and a second signal corresponding to the shear wave. The relative attenuation between the two waves provides an indication of the number and width of fractures extending across the path between the transmitter and the receiver. It is apparent that this technique is time consuming and costly, and has limited application for industrial use in the field.

Accordingly, it is an object of the present invention to overcome the above-mentioned difficulties of conventional systems for examining formations traversed by a well bore.

Another object of the invention is to provide novel methods and apparatus for detecting fractures in a formation through which a borehole extends.

A further object of the invention is to provide improved methods and apparatus for detecting and measuring acoustic shear waves transmitted through a formation adjacent a borehole.

These and other objects and advantages of the invention are attained by combining the acoustic waves received at two locations spaced different distances from a single acoustic wave transmitter in the borehole so as to cancel the components of the electrical signals which are generated by the receivers in response to the waves which travel at compressional velocities between the transmitter and the receivers.

The features and advantages of the invention are more fully explained in the following detailed description thereof when taken in conjunction with the accompanying drawings, in which:

FIG. 4 is a schematic circuit diagram of some of the electronic circuitry illustrated in FIG. 3;

FIG. 5 is a detailed block diagram of some of the electronic circuitry illustrated in FIG. 1.

Figure 1:
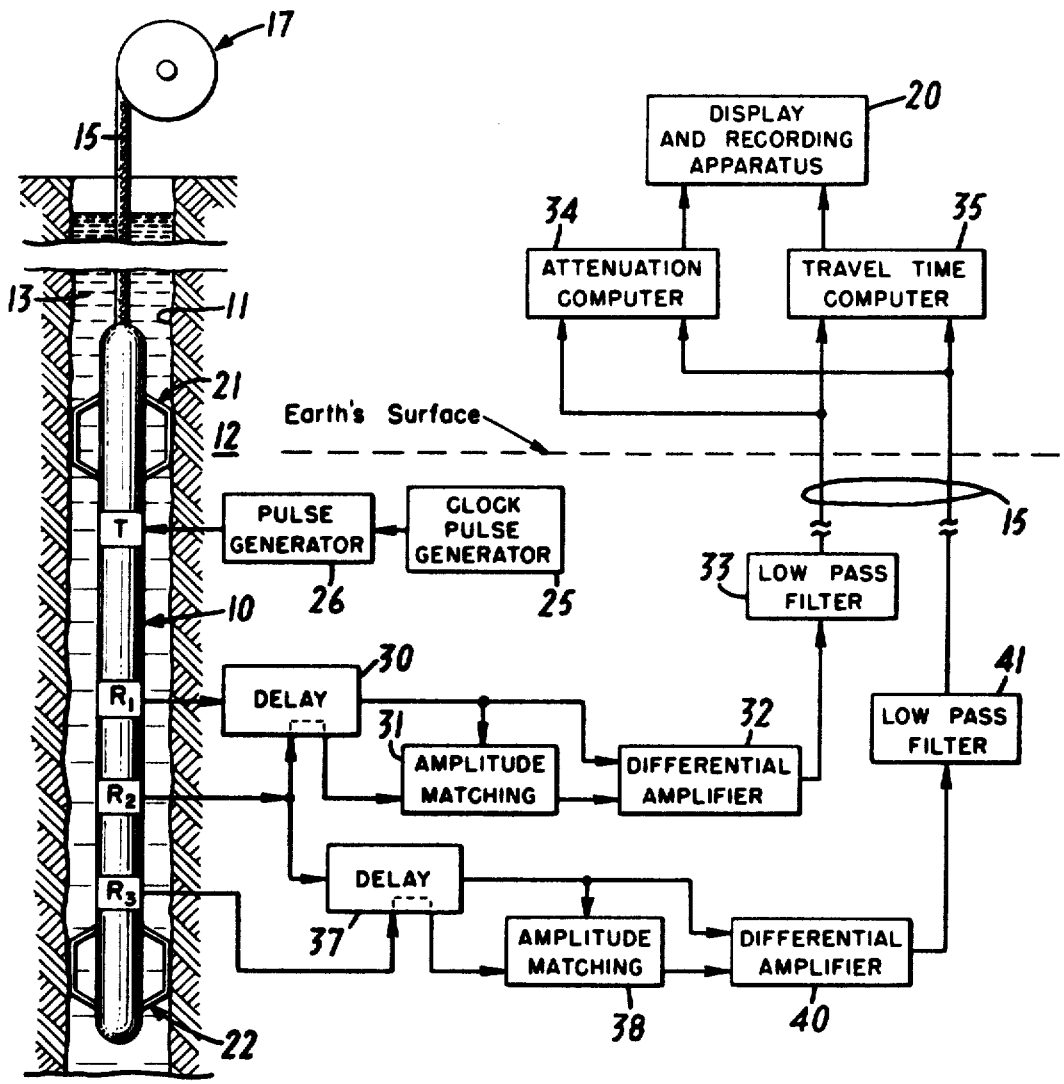
FIG. 1 illustrates the well logging tool according to the invention in position in the well bore in the earth including, in block diagram form, the electronic circuitry therefor.

In the embodiment of the invention shown by way of example in the drawings, a sonde 10 is disposed in a borehole 11 which extends from the surface through earth formations 12, the borehole being filled with the usual drilling mud 13 which may be of the water base or oil base variety. The sonde 10 is suspended for movement through the borehole by a multi-conductor armored cable 15 which is wound on a conventional winch 17 at the earth's surface. The electronic circuitry in the tool 10 is powered through the cable 15 by a suitable source of electrical power (not shown) at the earth's surface, and the information for the acoustic logs is transmitted from the sonde through the cable to appropriate display apparatus 20 for making a permanent recording of these logs. Conventional centralizers 21 and 22 are provided adjacent the upper and lower ends of the tool for maintaining the tool properly centered in the borehole.

The sonde 10 mounts four longitudinally spaced electroacoustical transducers including a transmitter T and three receivers R1, R2 and R3. The transmitter T is preferably a shock excited transducer as disclosed in Patent No. 3,138,219, which issued Jan. 23, 1964. This transmitter may be designed so as to have a dominant frequency of about 20 kilocycles per second, for example. The three receivers R1, R2 and R3 may include a piezoelectric element of lead zirconate-lead titanate ceramic and may be mutually spaced by six inches, for example, while the closest receiver to the transmitter T may be spaced therefrom by about 3 feet.

A clock pulse generator 25 having a repetition rate of 10 cycles per second drives a conventional pulse generator 26 which in turn excites the transmitter T to transmit periodic pulses of acoustic energy through the drilling mud 13 as the sonde is moved through the borehole.

Figure 2:
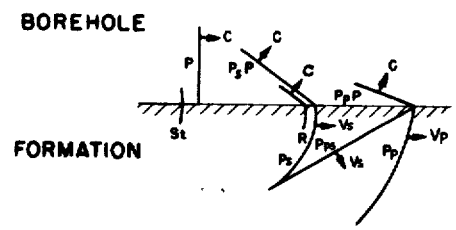
FIG. 2 is a simplified representation of the acoustic waves formed by a source of sound in a liquid filled borehole.

FIG. 2 is a simplified illustration of the system of wave fronts existing near the wall of a liquid-filled borehole shortly after excitation of a source of acoustic energy in the hole. The acoustic wave P travels through the drilling mud as a compressional wave at the mud velocity C. When the acoustic energy strikes the mud-formation interface, a refracted compressional wave $P_p$ is generated which travels through the formation at the formation compressional velocity $V_p$. Although the direction of particle motion due to the compressional wave $P_p$ is longitudinal, i.e. along the path of propagation, the formation alternately moves into and away from the mud as it is compressed and rarified. This transverse particle motion generates a shear wave in the formation $P_{ps}$ and also a compressional wave in the mud $P_pP$. The latter is a conical mud wave travelling at the mud (compressional) velocity C which is the first arrival at an acoustic receiver in the borehole as long as the compressional velocity in the formation is higher than in the mud, and it is this wave that is generally used in conventional transit time and attenuation logging. These waves travel from the transmitter to the formation as a compressional wave in the mud, are refracted at the borehole wall, and continue through the formation at the compressional velocity until they are again refracted to pass through the mud to the receiver.

When the shear wave velocity $V_s$ in the formation is greater than the acoustic (compressional) velocity C in the mud, another compressional conical wave $P_sP$ is dragged in the borehole by a refracted shear wave $P_s$. The formation shear velocity $V_s$ is always less than the formation compressional velocity $V_p$ and so the $P_sP$ wave is difficult to detect at an acoustic receiver because it is masked by the prior compressional $P_pP$ arrivals and is also interfered with by later compressional arrivals caused by later transmissions from the acoustic transmitter. In addition, interference is caused by the direct mud wave P as well as reverberations thereof in the borehole. These reverberations of the P wave in the borehole produce a series of $P_p$ compressional waves in the formation which are not shown in FIG. 2. All of these other $P_p$ waves travel at the formation compressional velocity $V_p$ and are delayed in accordance with the borehole diameter and the number of reverberations.

Also present are a Stoneley wave $S_t$ which travels at a relatively low velocity and a pseudo Rayleigh wave R which travels at essentially the same velocity as the shear wave. Thus the second arrival at an acoustic receiver is actually a compressional wave in response to a combination of the refracted shear wave $P_s$ and the pseudo Rayleigh wave R. For simplicity the combination of the refracted shear wave and the pseudo Rayleigh wave may be referred to as the shear velocity arrival.

Briefly, the apparatus according to the present invention combines the electrical representations of acoustic signals received by two spaced receivers so as to cancel the components thereof resulting from the refracted compressional waves thereby leaving the components due to the shear velocity arrival, i.e. the $P_pP$ waves are cancelled to leave the $P_sP$ wave. This is accomplished by first delaying the signal received at the receiver closer to the transmitter by the transit time of the refracted compressional waves between the two receivers, then adjusting the amplitude of one of the signals to make the amplitudes of the first (compressional) arrivals equal, and finally subtracting one of the resulting signals from the other. It will be recalled that since the formation compressional velocity $V_p$ exceeds the formation shear velocity $V_s$, the first portion of each received signal will be the compressional arrival $P_pP$.

Referring now to the block diagram in FIG. 1, the signal received by the receiver R1 is delayed by a delay circuit 30 in accordance with the time interval between the reception of the signals by the receivers R1 and R2, and the output of the delay 30 is fed to one input of an amplitude matching circuit 31, the other input of which is supplied by the receiver R2. The amplitude matching circuit 31 preferably adjusts the amplitude of the first compressional arrival of the signal received by the receiver R2 to equal that of the signal received by the receiver R1, and the outputs of the amplitude matching circuit are applied to a conventional differential amplifier 32 where the adjusted R2 signal is subtracted from the delayed R1 signal to provide a shear wave arrival signal to one of the inputs of conventional attenuation and travel time computers 34 and 35, respectively, through a conventional low pass filter 33. The output of the filter 33 is transmitted through the cable 15 to the computers 34 and 35, which are preferably located at the earth's surface along with the display apparatus 20.

Similarly, the signal received by the receiver R2 is delayed by a delay circuit 37 and the amplitude of the R3 signal is adjusted by the amplitude matching circuit 38, the outputs of which are subtracted by a differential amplifier 40 to produce the $P_sP$ wave which is received by the receiver R2. As before, the output of the differential amplifier 40 is fed through a low pass filter 41 to the attenuation and travel time computers.

Techniques for determining the attenuation and travel time of acoustic waves between a pair of spaced receivers generated from a single transmitter are well know to the acoustic logging art and so a detailed discussion of suitable attenuation and travel time computers 34 and 35 is not necessary. Similarly, the techniques by which the outputs of such computers are permanently recorded to present logs of attenuation and travel time as a function of depth in the borehole are well known, and so the display apparatus 20 also need not be discussed in detail.

It should be noted that in the novel arrangement according to the present invention, the three receivers R1, R2 and R3 are the equivalent of two receivers, one at R1 and one at R2, each of which provides an initial segment of an undistorted shear wave arrival, that is, a shear wave arrival that is not masked by prior and later compressional ($P_pP$) arrivals. Moreover, the subtraction technique according to the present invention cancels not only the compressional $P_pP$ arrival from the first $P_p$ refracted compressional wave, but also the later compressional $P_pP$ arrivals generated by the reverberations of the P wave in the borehole, since these waves have substantially the same velocity and attenuation between the receivers as that of the first refracted compressional arrival.

Figure 3:
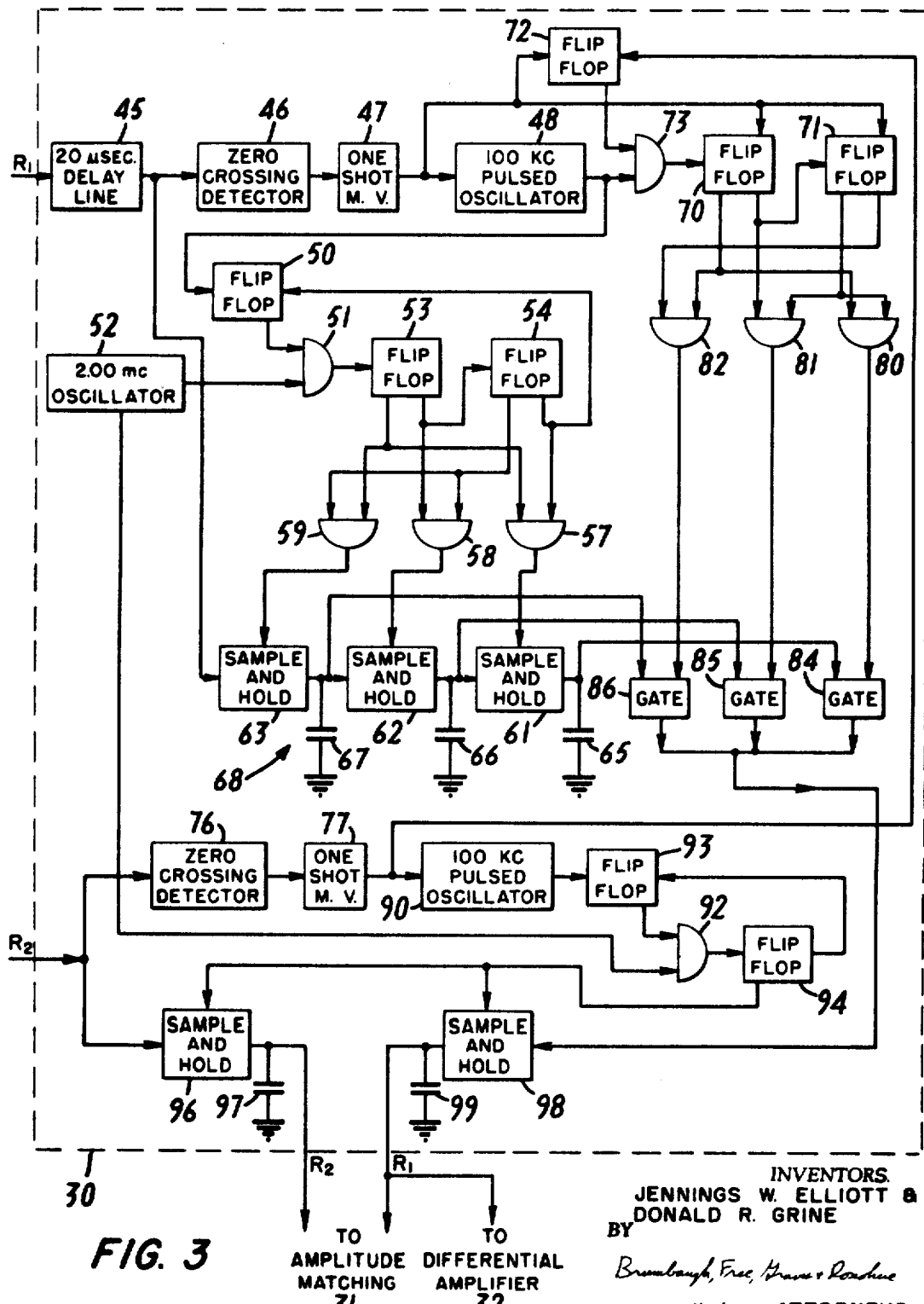
FIG. 3 is a detailed block diagram of some of the electronic circuitry illustrated in FIG. 1.

Inasmuch as the compressional wave travel time under conditions in which shear waves may be detected is from about 40 to 100 microseconds per foot, for a receiver spacing of six inches the delay circuits 30 and 37 provide a delay of between 20 and 50 microseconds. FIG. 3 shows a block diagram of a suitable form of delay circuit 30, it being understood that the delay 37 is identical. The R1 signal is first passed through a 20 microsecond conventional delay line 45 so that the remaining variable delay requirement is from zero to 30 microseconds. The first positive zero crossing of the delayed R1 signal is detected by a conventional zero crossing detector 46 which triggers a conventional "one shot" or monostable multivibrator 47 which in turn energizes a 100 kilocycle per second conventional pulsed oscillator 48 for the period of time during which the R1 signal is of interest. This period of time is selected to insure that enough of the shear wave arrival is detected for proper operation of the attenuation and travel time computers 34 and 35. A conventional "flip-flop" or bistable multivibrator 50 is turned on by each pulse from the oscillator 48 thereby opening a conventional gate 51 to feed four cycles from a conventional two megacycle oscillator 52 to a conventional two stage counter including a pair of flip-flops 53 and 54, the output of the flip-flop 54 turning off the flip-flop 50 and thereby de-energizing the gate 51.

Three conventional AND circuits 57, 58 and 59 are connected to the flip-flops 53 and 54 to decode the state of the counter and provide three consecutive 0.5 microsecond pulses for driving three sample and hold circuits 61, 62 and 63. Each sample and hold circuit, when energized, transfers the voltage applied to the input thereof to the corresponding one of the capacitors 65, 66 and 67 connected to its output. The sequence of the sampling pulses is such that the voltage stored on the capacitor 66 is first transferred to the capacitor 65, then the voltage on the capacitor 67 is transferred to the capacitor 66, and finally the level of the delayed R1 signal from the delay line 45 is transferred from the input of the sample and hold circuit 63 to the capacitor 67. The three sample and hold circuits 61, 62 and 63 are therefore each pulsed once for each 100 kilocycle per second clock pulse from the oscillator 48. The three sample and hold circuits with the three storage capacitors thus comprise a dynamic delay line 68 in which the samples of the R1 signal are shifted through one stage every ten microseconds.

When the R2 signal arrives, the first sample of the R1 signal will be stored either on the capacitor 67 (corresponding to a 20–30 microsecond difference between the R1 and R2 signals) on the capacitor 66 (corresponding to a 30–40 microsecond difference), or on the capacitor 65 (corresponding to a 40–50 microsecond difference).

In order to know where the first sample of the R1 signal is stored when the R2 signal arrives, a counter including a pair of flip-flops 70 and 71 counts the number of 100 kilocycle per second clock pulses occurring during the interval between the R1 and R2 signal arrivals. When the R1 signal is detected, the one shot multivibrator 47 turns on a flip-flop 72 which opens a gate 73 which feeds the 100 kc. clock pulses to this last named counter. The first positive zero crossing of the R2 signal is detected by a conventional zero crossing detector 76 which turns on a one shot multivibrator 77 for the length of time during which the R2 signal is of interest. The multivibrator 77 turns off the flip-flop 72 at the first positive zero crossing of the R2 signal, thus closing the gate 73 and stopping the counter including the flip-flops 70 and 71 at the count which indicates which of the capacitors 65, 66 and 67 is storing the first sample of the R1 signal. This counter is decoded by three conventional AND circuits 80, 81 and 82. The outputs of these AND circuits are connected to a corresponding one of the inputs of three gates 84, 85 and 86, respectively, the other inputs of which are connected to the capacitors 65, 66 and 67 respectively. In this way the sample of the R1 signal is read out of the proper one of the three stage dynamic delay line 68.

The multivibrator 77 triggered by the R2 signal also energizes a second 100 kilocycle per second pulsed oscillator 90, each output pulse of which opens at gate 92 through a flip-flop 93 to feed two cycles from the two megacycle clock oscillator 52 to a flip-flop 94, inasmuch as the flip-flop 94 turns off the flip-flop 93. The output of the flip-flop 94 is thus a 0.5 microsecond pulse which drives a sample and hold circuit 96 to transfer a sample of the R2 signal at the input thereof to a storage capacitor 97. At the same time that the R2 signal is so sampled, the gated output of the R1 dynamic delay line, i.e. the output of the appropriate one of the gates 84, 85 and 86, is transferred by a sample and hold circuit 98 to a storage capacitor 99, so that the R1 and R2 signals appear on the storage capacitors 97 and 99 as two series of samples which are exactly in phase.

The clock signals provided by the two megacycle oscillator 52 to the sample and hold circuits 96 and 98 are of opposite phase to that used for stepping the samples of the R1 signal between stages of the dynamic delay line 68, so that it is not possible to read out from this delay line while the line is active.

FIG. 4 illustrates the schematic circuit diagram of the sample and hold circuit 63 of FIG. 3, it being understood that the other sample and hold circuits are identical. An electrical signal which is to be sampled is applied to an input terminal 101 which is coupled through a resistor 102 to ground and is connected directly to the bases of a pair of transistors 103 and 104, which, in turn, are coupled in parallel between a terminal 105, adapted to be connected to a source of positive voltage (not shown), and a terminal 106, adapted to be connected to a source of negative voltage (not shown).

The collector of the transistor 103 is connected directly to the terminal 106, and the emitter thereof is coupled through a resistor 107 to the terminal 105 and through a diode 108 to a terminal 109. Similarly, the collector of the transistor 104 is connected directly to the terminal 105, while the emitter thereof is coupled through a resistor 111 to the terminal 106 and through a diode 112 to a terminal 113. The polarity of the diode 112 is such that it is conductive when the potential of the terminal 113 exceeds that of the emitter of the transistor 104, while the polarity of the diode 108 is such that it is conductive when the potential of the emitter of the transistor 103 exceeds that of the terminal 109.

The emitters of the transistors 103 and 104 are also connected to the bases of a pair of transistors 115 and 116, respectively, which are connected "back-to-back" in series between the terminals 105 and 106. Thus, the collectors of the transistors 115 and 116 are connected directly to the terminals 105 and 106, while the emitters of these transistors are coupled together through a pair of series-connected resistors 117 and 118. The output of the sample and hold circuit appears at a terminal 120 which is connected to the junction of the resistors 117 and 118 and which may be connected to the storage capacitor 67 of the dynamic delay line 68, for example.

In order to sample a signal at the terminal 101, a pair of opposite polarity sampling pulses are applied to the terminals 109 and 113. Thus a positive pulse from the AND circuit 59, for example, is applied to the terminal 109 and to a conventional inverter circuit (not shown) which simultaneously supplies a negative pulse to the terminal 113. The sampling pulses disable the diodes 108 and 112 which otherwise clamp the emitters of the transistors 103 and 104 to prevent the transmission of the input signal at the terminal 101 therethrough. Thus, during the duration of the sampling pulses, both positive and negative input signals may be transmitted through two signal paths, defined by the transistors 103 and 115 and the transistors 104 and 118, into the storage capacitor 67.

This sample and hold circuit thus provides bilateral charging of the storage capacitor 67 so that the level on this capacitor can be changed rapidly in either direction. Also, each of these two signal paths, including the transistors 103 and 115 and the transistors 104 and 116, has two junctions of opposite polarity in series so that changes in base-emitter voltage drop tend to cancel. Furthermore, the leakage currents in the output transistors 115 and 116 are of opposite sign and tend to cancel each other.

FIG. 5 illustrates the amplitude matching circuit 31, it being understood that the amplitude matching circuit 38 is identical. The sampled R2 signal appearing on the storage capacitor 97 of FIG. 3 is fed to a conventional variable gain amplifier 125, the gain of which is controlled by circuitry now to be explained so that the amplitude of the compressional arrival at the output thereof equals that of the delayed R1 signal appearing on the storage capacitor 99. The output of the variable gain amplifier 125 is fed directly to the differential amplifier 32, and also through a gate 126 to a conventional square law detector 127. The gate 126 is enabled by a conventional pulse generator 128, which is triggered by the zero-crossing detector 76 (see FIG. 3), when the R2 signal arrives. The duration of the output pulse from the gating pulse generator 128 is such that three or four excursions of the R2 compressional arrival, for example, are fed to the detector 127, which thus measures the energy of the portion of the R2 signal fed thereto. The output of the detector 127 drives one input of a conventional differential amplifier 130.

Similarly, the same portion of the R1 compressional arrival is fed to a square law detector 131 through a gate 132 which is also enabled by the pulse generator 128. The output of the detector 131 drives the other input of the differential amplifier 130, the output difference signal of which is fed to the gain-controlling electrode of the variable gain amplifier 125. The amplifier 125 is thus automatically controlled by the differential amplifier 130 so that the amplitudes of the R1 and R2 compressional $P_pP$ arrivals fed to the differential amplifier 32 are equal.

The differential amplifier 32 then subtracts the adjusted amplitude R2 signal from the delayed R1 signal to cancel the compressional $P_pP$ waves thereby leaving the shear wave arrival which is fed to the attenuation and travel time computers as discussed above.

The low-pass filters 33 and 41 smooth or remove the stepped nature of the waveforms fed thereto, which are caused by the sampling accomplished in the delay circuits 30 and 37. Inasmuch as the sampling rate is 100 kilocycles per second, these low-pass filters preferably cut off sharply at 50 kilocycles per second. Negligible information is lost from the shear wave signals by removing the components therefrom having frequencies higher than 50 kilocycles per second, and it is well known from information theory that any signal can be sampled at a rate only slightly higher than twice the highest frequency component contained therein without losing any information contained in the original signal.

Figure 6:
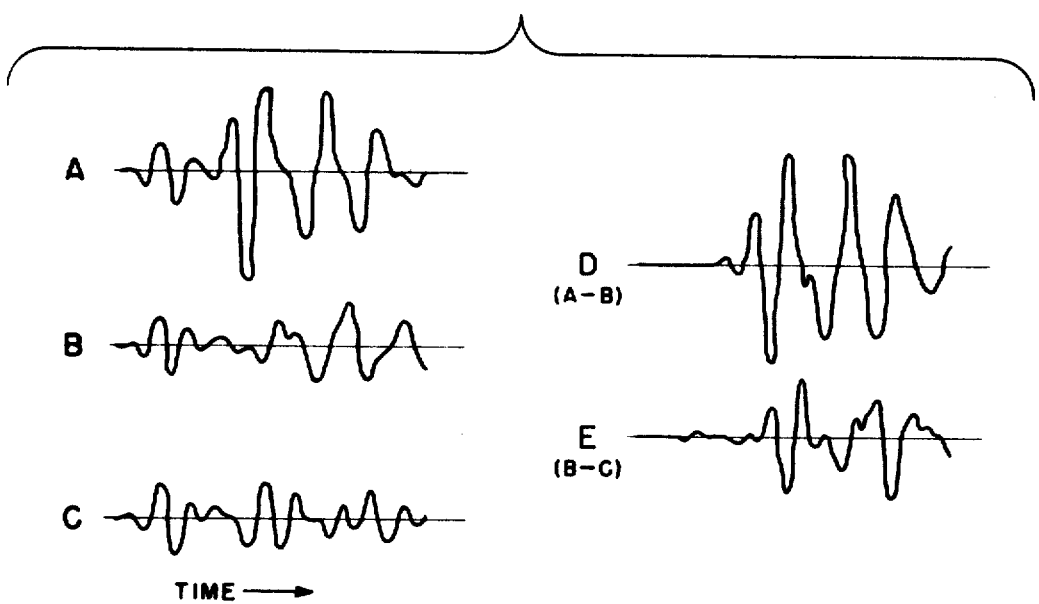
FIG. 6 is a series of waveforms useful in explaining the operation of the circuit of FIG. 1.

FIG. 6 shows waveforms which illustrate the manner in which the shear wave arrival may be recovered from the acoustic waves received at two spaced locations from a single transmitter in a borehole by cancelling the compressional $P_pP$ waves in accordance with the present invention. The waveforms 6A, 6B and 6C illustrate typical acoustic waves received by the receivers R1, R2 and R3, respectively. These waveforms are so aligned that the delay of the first arrivals between the receivers has been removed. Furthermore, the amplitudes of the first (compressional) arrivals are the same. The waveform 6D was obtained from the subtraction of waveform 6B from 6A, and it is apparent that the compressional arrival has been eliminated leaving only the desired shear wave arrival. Similarly, waveform 6E was obtained by subtracting waveform 6C from 6B. It may be observed that the shear wave arrival in waveform 6E (corresponding to the receiver R2) is delayed from that in waveform 6D (corresponding to the receiver R1), inasmuch as the spread between the compressional and shear wave arrivals increases in proportion to the distance from the acoustic transmitter.

While the fundamental novel features of the invention have been shown and described, it will be understood that various substitutions, changes and modifications in the form and details of the apparatus illustrated and its manner of operation may be made by those skilled in the art without departing from the spirit of the invention. Thus it is apparent that the novel subtraction technique may be used with acoustic waves of any desired frequency, appropriate adjustment being made in the spacing between the transmitter T and the receivers R1, R2 and R3. Furthermore, the R1, R2 and R3 signals may be transmitted through the cable 15 after suitable amplification, the other circuitry discussed above being located at the earth's surface. Interchannel crosstalk may be minimized by conventional multiplexing techniques. For example, conventional time delay networks may be employed to transmit the three signals up the cable sequentially, suitable gating circuits rejecting the later arriving direct mud waves P as necessary. All such variations and modifications therefore, are included within the intended scope of the invention as defined by the following claims.

We claim:
1. Apparatus for detecting the shear wave arrival in an acoustic wave received in a borehole extending through an earth formation, comprising means for transmitting acoustic energy from the borehole into the formation, first receiving means at a first location in the borehole for generating a first electrical signal in response to the acoustic energy received from the formation, second receiving means at a second location in the borehole for generating a second electrical signal in response to the acoustic energy received from the formation, the second receiving means being located at a greater distance from the trans- mitting means than is the first receiving means, means for delaying the first electrical signal in accordance with the transit time of acoustic energy traveling at formation compressional velocities between the first and second locations, means for adjusting the amplitude of the second electrical signal in accordance with the attenuation of acoustic energy traveling at formation compressional velocities between the first and second locations, and means for subtracting one from the other of the delayed first electrical signal and the adjusted second electrical signal.

2. Apparatus for examining a formation through which a borehole extends, comprising transmitting means for emitting acoustic energy in a borehole opposite a formation, first transducer means in first spaced relation to the transmitting means for generating a first electrical signal in response to the acoustic energy received from the formation, second transducer means in second, farther spaced relation to the transmitting means for generating a second electrical signal in response to the acoustic energy received from the formation, means for delaying the first electrical signal in accordance with the transit time of acoustic energy traveling in a compressional mode over a spacing corresponding to that between the first and second transducer means, means for adjusting the amplitude of the second electrical signal in accordance with the attenuation of acoustic energy traveling in a compressional mode over a spacing corresponding to that between the first and second transducer means, and means responsive to the delayed first electrical signal and the adjusted second electrical signal to produce a further signal which varies as a function of the difference between said first and second signals.

3. Apparatus for examining a formation through which a borehole extends, comprising means for transmitting acoustic energy from the borehole into the formation, first transducer means in first spaced relation to the transmitting means for generating a first electrical signal in response to the acoustic energy received from the formation, second transducer means in second spaced relation to the transmitting means for generating a second electrical signal in response to the acoustic energy received from the formation, means for delaying the first electrical signal in accordance with the transit time of acoustic energy traveling at formation compressional velocities between the first and second transducer means, means for adjusting the amplitude of the second electrical signal in accordance with the attenuation of acoustic energy traveling at formation compressional velocities between the first and second transducer means, means for subtracting one from the other of the delayed first electrical signal and the adjusted second electrical signal to produce a first subtracted signal.

4. Apparatus according to claim 3, including means responsive to the first subtracted signal for determining the attenuation suffered by the acoustic energy between the transmitting means and one of the first and second transducer means.

5. Apparatus according to claim 3, including means responsive to the first subtracted signal for determining the transmission time of the acoustic energy between the transmitting means and one of the first and second transducer means.

6. Apparatus according to claim 3, wherein the delaying means includes means for detecting the arrival of the first electrical signal, means responsive to the first signal detecting means for generating at least one first sampling pulse, means responsive to the first sampling pulse generating means for sampling a portion of the first electrical signal, means for storing the sampled portion of the first electrical signal, means for detecting the arrival of the second electrical signal, means responsive to the second signal detecting means for generating at least one second sampling pulse, and means responsive to the second sampling pulse generating means for simultaneously transferring a portion of the second electrical signal to the amplitude adjusting means and transferring the stored sampled portion of the first electrical signal to the subtracting means.

7. Apparatus for examining a formation through which a borehole extends, comprising means for transmitting acoustic energy from the borehole into the formation, first transducer means in first spaced relation to the transmitting means for generating a first electrical signal in response to the acoustic energy received from the formation, second transducer means in second spaced relation to the transmitting means for generating a second electrical signal in response to the acoustic energy received from the formation, means for delaying the first electrical signal in accordance with the transit time of acoustic energy traveling at formation compressional velocities between the first and second transducer means, means for adjusting the amplitude of the second electrical signal in accordance with the attenuation of acoustic energy traveling at formation compressional velocities between the first and second transducer means, means for subtracting one from the other of the delayed first electrical signal and the adjusted second electrical signal to produce a first subtracted signal, third transducer means in third spaced relation to the transmitting means for generating a third electrical signal in response to the acoustic energy received from the formation, means for delaying the second electrical signal in accordance with the transit time of acoustic energy traveling at formation compressional velocities between the second and third transducer means, means for adjusting the amplitude of the third electrical signal in accordance with the attenuation of acoustic energy traveling at formation compressional velocities between the second and third transducer means, and means for subtracting one from the other of the delayed second electrical signal and the adjusted third electrical signal to produce a second subtracted signal.

8. Apparatus according to claim 7, wherein the subtracting means subtracts the adjusted second electrical signal from the delayed first electrical signal and subtracts the adjusted third electrical signal from the delayed second electrical signal, and including means responsive to the first and second subtracted signals for determining the attenuation suffered by the acoustic energy between the first and second transducer means.

9. Apparatus according to claim 8, including means responsive to the first and second subtracted signals for determining the transmission time of the acoustic energy between the first and second transducer means.

10. Apparatus according to claim 9, including means for recording the attenuation and transmission time determined at various depths in the borehole.

11. Apparatus for delaying a first electrical signal so as to be in phase with a later arriving second electrical signal, comprising means for detecting the arrival of the first electrical signal, means responsive to the first signal detecting means for generating at least one first sampling pulse, means responsive to the first sampling pulse generating means for sampling a portion of the first electrical signal, means for storing the sampled portion of the first electrical signal, means for detecting the arrival of the second electrical signal, means responsive to the second signal detecting means for generating at least one second sampling pulse, and means responsive to the second sampling pulse generating means for simultaneously transferring a portion of the second electrical signal to a first output terminal and transferring the stored sampled portion of the first electrical signal to a second output terminal.

12. Apparatus for delaying a first electrical signal so as to be in phase with a later arriving second electrical signal, comprising means for detecting the arrival of the first electrical signal, means responsive to the first signal detecting means for generating at least one first sampling pulse, means responsive to the first sampling pulse generating means for sampling a portion of the first electrical signal, means for storing the sampled portion of the first electrical signal, means for detecting the arrival of the second electrical signal, means responsive to the second signal detecting means for generating at least one second sampling pulse, and means responsive to the second sampling pulse generating means for simultaneously transferring a portion of the second electrical signal to a first output terminal and transferring the stored sampled portion of the first electrical signal to a second output terminal, wherein the storing means includes a plurality of cascaded storage elements and at least one means for transferring the signal stored on each storage element to the next storage element, each transferring means being coupled between a different pair of adjacent storage elements, and including means responsive to each first sampling pulse for generating a plurality of successive transfer pulses, and means for coupling each of the transfer pulses to a different one of the transferring means, each transferring means transferring the signal stored on a different storage element to the next storage element when activated by a transfer pulse.

References Cited

UNITED STATES PATENTS

| | | | |
|---|---|---|---|
| 2,691,422 | 10/1954 | Summers et al. | 181—.5 |
| 2,943,694 | 7/1960 | Goodman | 181—.5 |
| 3,013,211 | 12/1961 | Garabedian | 328—109 |
| 3,143,666 | 8/1964 | Aaronson | 328—155 X |
| 3,177,467 | 4/1965 | Brokaw | 340—18 |
| 3,213,375 | 10/1965 | St. John | 328—72 X |
| 3,252,099 | 5/1966 | Dodd | 328—151 X |
| 3,252,131 | 5/1966 | Vogel | 181—.5 |
| 3,259,880 | 7/1966 | Zemanek | 340—18 |
| 3,310,751 | 3/1967 | Atzenbeck | 328—151 X |
| 3,333,238 | 7/1967 | Caldwell | 181—.5 |

OTHER REFERENCES

Pickett, Acoustic Character Logs in Formation Evaluation, Journal of Petroleum Technology, June 1963, pp. 659–667.

RODNEY D. BENNETT, *Primary Examiner.*

BENJAMIN A. BORCHELT, *Examiner.*

R. M. SKOLNIK, D. C. KAUFMAN,
*Assistant Examiners.*